United States Patent
Lee

(10) Patent No.: US 11,196,301 B1
(45) Date of Patent: Dec. 7, 2021

(54) SYNCHRONOUS AUTO-ZERO COMPARATOR FOR WIRELESS POWER RECTIFIER

(71) Applicant: STMicroelectronics Asia Pacific Pte Ltd, Singapore (SG)

(72) Inventor: Teerasak Lee, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 17/124,174

(22) Filed: Dec. 16, 2020

(51) Int. Cl.
*H02J 50/12* (2016.01)
*H02M 7/219* (2006.01)

(52) U.S. Cl.
CPC ............. *H02J 50/12* (2016.02); *H02M 7/219* (2013.01)

(58) Field of Classification Search
CPC ................................ H02J 50/12; H02M 7/219
See application file for complete search history.

(56) References Cited

U.S. PATENT DOCUMENTS

2021/0066968 A1* 3/2021 Danilovic ............. H02M 7/219

* cited by examiner

*Primary Examiner* — Robert L Deberadinis
(74) *Attorney, Agent, or Firm* — Crowe & Dunlevy

(57) ABSTRACT

A bridge rectifier is formed by a first transistor coupled between a regulator output and a first tap, a second transistor coupled between the regulator output and a second tap, a third transistor coupled between the first tap and ground, and a fourth transistor coupled between the second tap and ground. A first comparator circuit, when enabled, compares ground to a voltage at the first tap and asserts a first low-side control signal to turn on the third transistor when the voltage at the first tap is below ground, and, when reset, samples an offset of the first comparator circuit. A second comparator circuit, when enabled, compares ground to a voltage at second first tap and asserts a second low-side control signal to turn on the fourth transistor when the voltage at the second tap is below ground, and, when reset, samples an offset of the second comparator circuit.

20 Claims, 12 Drawing Sheets

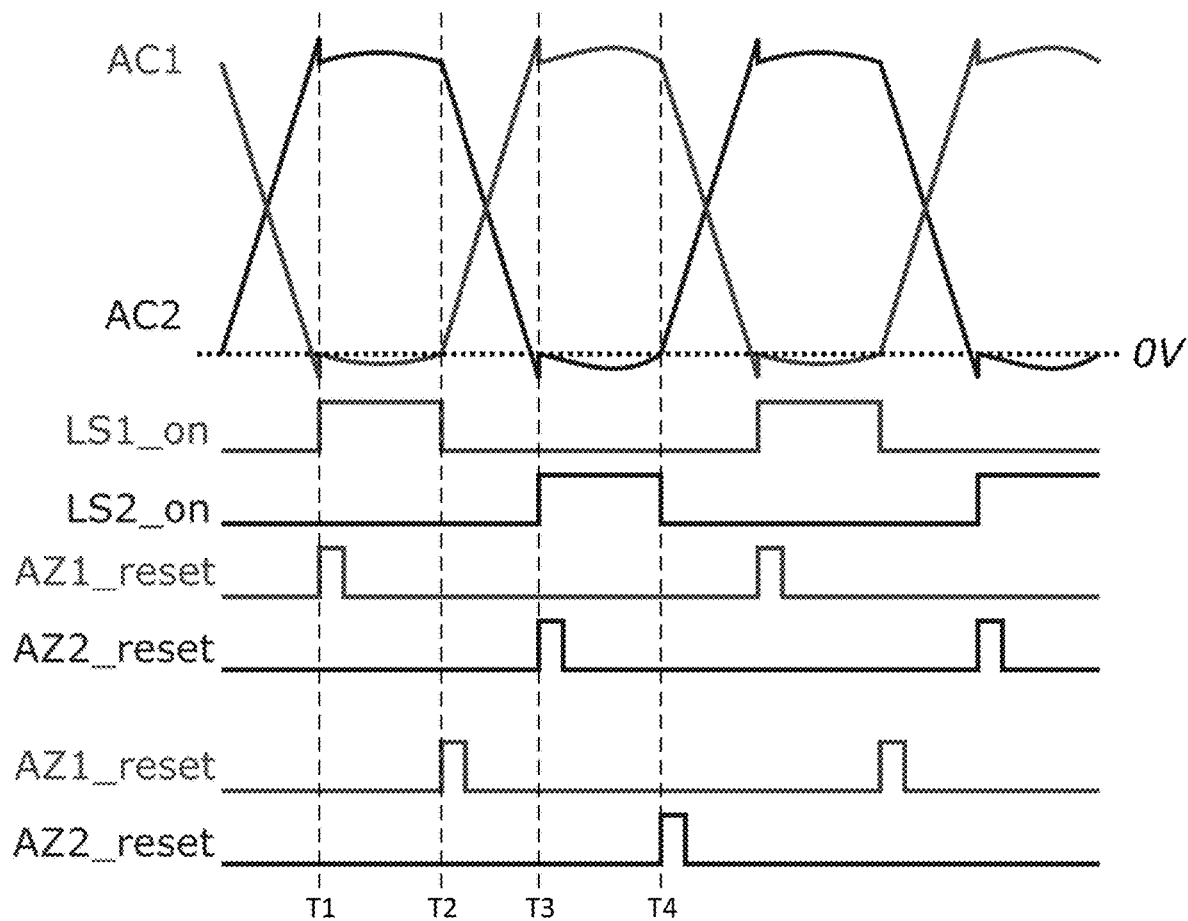
FIG. 7
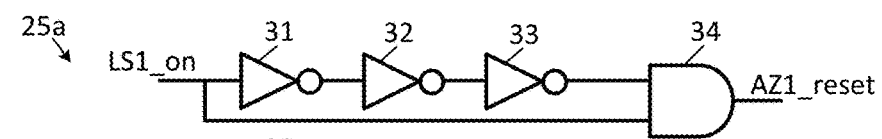
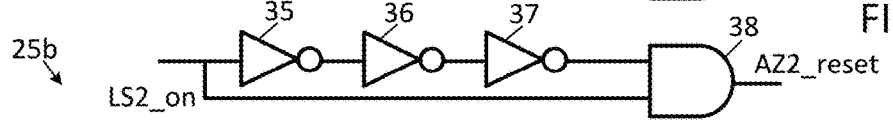
FIG. 8A
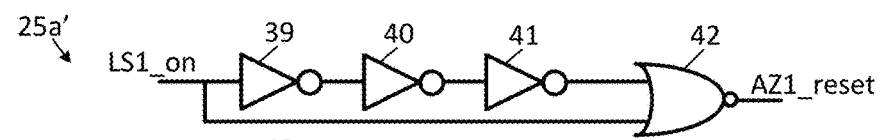
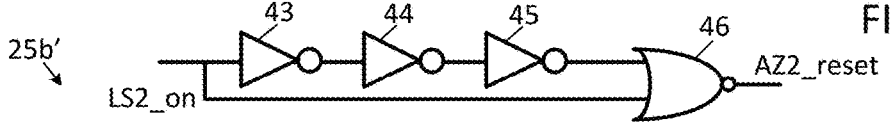
FIG. 8B

SYNCHRONOUS AUTO-ZERO COMPARATOR FOR WIRELESS POWER RECTIFIER

TECHNICAL FIELD

This application is directed to the field of wireless power transmission and, in particular, to a comparator design and the generation of control signals therefor for use in controlling a bridge rectifier of a wireless power transmission system.

BACKGROUND

Portable electronic devices, such as smartphones, smartwatches, audio output devices (earbuds, headphones), and wearables operate on battery power, and not from wired power transmitted thereto over wired transmission lines and distribution systems. The batteries used for such devices are typically rechargeable and, therefore, a way to recharge the power of such batteries is necessary.

Most portable electronic devices include a charging port, typically conforming to the Micro USB or USB-C standards, into which a power cord connected to a power source can be inserted to provide for recharging of their batteries. However, such charging ports may make it difficult to enhance the water resistance of the electronic device, and are subject to damage from repeated use. In addition, some smaller portable electronic devices (for example, earbuds and smartwatches) may lack the available space to provide for a charging port. Still further, some users may find it cumbersome to plug a power cord into the charging port of an electronic device to charge the battery of that device.

Therefore, to address these issues, wireless power transmission has been developed. As shown in FIG. 1, a typical prior art wireless power transmission system 10 utilizes a transmitter 11 including a transmission coil Lp and a serial capacitance Cp forming a serial resonant LC network, driven by electric power from a power source 12 (typically a wired connection, but in some cases a battery), that generates a time-varying electric field, and a receiver 15 including a receiver coil Ls and a serial capacitance Cs forming a similar serial resonant LC network in which the time-varying electric field induces an AC current.

The receiver 15 includes a bridge rectifier 16 that rectifies the AC current to produce a DC current that charges a tank capacitor Ctank, connected to an input node Nin of a regulator 17, to a regulator input voltage. The regulator 17, typically a low dropout amplifier, produces a regulated output voltage at its output node Nout, which is provided to a load (represented by the load resistance Rl and the load capacitance Cl). The rectified voltage produced at the input node Nin of the regulator 17 may be on the order of, for example, 25V, and the output of the regulator 17 at the output node Nout may be on the order of, for example, 5V.

A sample configuration for the bridge rectifier 16 is shown in FIG. 2, where it can be seen that the bridge rectifier is comprised of a first pair of series coupled n-channel transistors Q1 and Q3, coupled in parallel with a second pair of series coupled n-channel transistors Q2 and Q4, between the input node Nin of the regulator 17 and ground. Gate control circuitry 20 generates a control signal HS1_on fed to the gate of the transistor Q1, a control signal HS2_on fed to the gate of the transistor Q2, a control signal LS1_on fed to the gate of the transistor Q3, and a control signal LS2_on fed to the gate of the transistor Q4. In particular, the control signal LS1_on is generated by a comparator 23 having a non-inverting input coupled to ground and an inverting input coupled to a tap AC1 between transistors Q1 and Q3, and the control signal LS2_on is generated by a comparator 24 having a non-inverting input coupled to ground and an inverting input coupled to a tap AC2 between transistors Q2 and Q4. In addition, the control signal LS1_on is buffered by a buffer 22 to produce the control signal HS2_on, and the control signal LS2_on is buffered by a buffer 21 to produce the control signal HS1_on.

Operation of the bridge rectifier 16 will now be described with additional reference to FIG. 3. The transmitter 11 generates a time-varying electric field, which induces an AC current in the receiver coil Ls of the receiver 15. When the voltage at the tap AC1 falls to cross zero at time T1, the output of the comparator 23 goes high, asserting the control signal LS1_on, which is buffered by buffer 22 to assert HS2_on. The control signals LS1_on and HS2_on so asserted serve to turn on transistors Q3 and Q2, causing current to flow from ground to AC1 through transistor Q3, from AC1 to AC2 through receiver coil Ls, and from AC2 to Nin through transistor Q2.

At time T2, the voltage at AC1 rises to cross zero, with the result being that the comparator 23 deasserts the control signal LS1_on, and therefore the buffer 22 deasserts the control signal HS2_on, turning off transistors Q3 and Q2.

At time T3, when AC2 falls to cross zero, the output of the comparator 24 goes high, asserting the control signal LS2_on, which is buffered by buffer 21 to assert HS1_on. The control signals LS2_on and HS1_on so asserted serve to turn on transistors Q4 and Q1, causing current to flow from ground to AC2 through transistor Q4, from AC2 to AC1 through receiver coil Ls, and from AC1 to Nin through transistor Q1.

At time T4, the voltage at AC2 rises to cross zero, with the result being that the comparator 22 deasserts the control signal LS2_on, and therefore the buffer 21 deasserts the control signal HS1_on, turning off transistors Q4 and Q1.

These operations repeat. The result is that current flows from Nin1 to the tank capacitor Ctank, and the voltage on the tank capacitor Ctank is fed to the regulator 17 as input to produce an output voltage at Nout.

The amplitudes of the AC voltages at AC1 and AC2 during zero crosses are dependent upon the current in the receiver coil Ls, and the on-resistance of the transistors Q3 and Q4. Rectifier efficiency is dependent upon the on-resistance of its transistors, therefore the on-resistance of transistors Q3 and Q4 is low, for example under 100 mΩ for applications where greater than 5 W of power is delivered. Under heavy load, the current through the receiver coil Ls is sufficient for the amplitude of the voltages at AC1 and AC2 during zero crossing to properly trigger the comparators 23 and 24. However, at light load, the voltages at AC1 and AC2 might be small enough that the output of the comparators 23 and 24 is inaccurate due to offset. Indeed, in some instances, the magnitude of the negative voltage at AC1 and AC2 zero cross may be less than the comparator offset.

Inaccurate comparator output negatively affects the efficiency of the rectifier 16, and may negatively affect frequency shift keying (FSK) communications between the receiver 15 and transmitter 11. As such, further development is needed.

SUMMARY

Disclosed herein is a wireless power receiver, including: a bridge rectifier formed by a first transistor coupled between a regulator output node and a first tap, a second transistor coupled between the regulator output node and a second tap, a third transistor coupled between the first tap and ground, and a fourth transistor coupled between the second tap and ground. The wireless power receiver includes a first comparator circuit configured to: when enabled, compare ground to a voltage at the first tap, and assert a first low side control signal to turn on the third transistor, when the voltage at the first tap is below ground; and when reset, sample an offset of the first comparator circuit. The wireless power receiver includes a second comparator circuit configured to: when enabled, compare ground to a voltage at second first tap, and assert a second low side control signal to turn on the fourth transistor, when the voltage at the second tap is below ground; and when reset, sample an offset of the second comparator circuit.

A first buffer may be configured to buffer the second low side control signal to produce a first high side control signal to turn on the first transistor when the voltage at the second tap is below ground, and a second buffer may be configured to buffer the first low side control signal to produce a second high side control signal to turn on the second transistor when the voltage at the first tap is below ground.

The first comparator circuit may include: a first comparator having its inverting input selectively coupled to its output by a first switch and selectively coupled to the first tap by a second switch, and having its non-inverting input selectively coupled to ground by a third switch and selectively coupled to signal ground by a fourth switch, wherein the output of the first comparator is coupled to a gate of the third transistor to deliver the first low side control signal thereto; and a first output capacitor coupled between the output of the first comparator and signal ground. The first and fourth switches may be closed when a first reset signal is asserted and otherwise open, and the second and third switches may be closed when the first reset signal is deasserted and otherwise open.

The second comparator circuit may include: a second comparator having its inverting input selectively coupled to its output by a fifth switch and selectively coupled to the second tap by a sixth switch, and having its non-inverting input selectively coupled to ground by a seventh switch and selectively coupled to signal ground by an eighth switch, wherein the output of the second comparator is coupled to a gate of the fourth transistor to deliver the second low side control signal thereto; and a second output capacitor coupled between the output of the second comparator and signal ground. The fifth and eighth switches may be closed when a second reset signal is asserted and otherwise open, and the sixth and seventh switches may be closed when the second reset signal is deasserted and otherwise open.

Control circuitry may be configured to: assert the first reset signal from shortly after the voltage at the first tap increases to rise above zero until shortly before the voltage at the first tap decreases to fall below zero; and assert the second reset signal from shortly after the voltage at the second tap increases to rise above zero until shortly before the voltage at the second tap decreases to fall below zero.

Control circuitry may be configured to: assert the second reset signal when the first low side control signal is asserted; and assert the first reset signal when the second low side control signal is asserted.

Control circuitry may be configured to: assert the first reset signal at rising edges of the first low side control signal for a period of time less than a period of time over which the first low side control signal is asserted; and assert the second reset signal at rising edges of the second low side control signal for a period of time less than a period of time over which the second low side control signal is asserted.

Control circuitry may be configured to: assert the first reset signal at falling edges of the first low side control signal for a period of time less than a period of time over which the first low side control signal is asserted; and assert the second reset signal at falling edges of the second low side control signal for a period of time less than a period of time over which the second low side control signal is asserted.

A third comparator circuit may be configured to: when enabled, compare ground to the voltage at the second tap, and assert a first high side control signal to turn on the first transistor, when the voltage at the second tap is below ground; and when reset, sample an offset of the third comparator circuit. A fourth comparator circuit may be configured to: when enabled, compare ground to the voltage at the first tap, and assert a second high side control signal to turn on the second transistor, when the voltage at the first tap is below ground; and when reset, sample an offset of the fourth comparator circuit.

The first comparator circuit may include: a first comparator having its inverting input selectively coupled to its output by a first switch and selectively coupled to the first tap by a second switch, and having its non-inverting input selectively coupled to ground by a third switch and selectively coupled to signal ground by a fourth switch, wherein the output of the first comparator is coupled to a gate of the third transistor to deliver the first low side control signal thereto; and a first output capacitor coupled between the output of the first comparator and signal ground. The first and fourth switches may be closed when the second high side control signal is asserted and otherwise open; and the second and third switches may be closed when the second high side control signal is deasserted and otherwise open.

The second comparator circuit may include: a second comparator having its inverting input selectively coupled to its output by a fifth switch and selectively coupled to the second tap by a sixth switch, and having its non-inverting input selectively coupled to ground by a seventh switch and selectively coupled to signal ground by an eighth switch, wherein the output of the second comparator is coupled to a gate of the fourth transistor to deliver the second low side control signal thereto; and a second output capacitor coupled between the output of the second comparator and signal ground. The fifth and eighth switches may be closed when the first high side control signal is asserted and otherwise open, and the sixth and seventh switches may be closed when the first high side control signal is deasserted and otherwise open.

The third comparator circuit may include: a third comparator having its inverting input selectively coupled to its output by a ninth switch and selectively coupled to the second tap by a tenth switch, and having its non-inverting input selectively coupled to ground by an eleventh switch and selectively coupled to signal ground by a twelfth switch, wherein the output of the third comparator is coupled to a gate of the first transistor to deliver the first high side control signal thereto; and a third output capacitor coupled between the output of the third comparator and signal ground. The ninth and twelfth switches may be closed when a first reset signal is asserted and otherwise open, and the tenth and eleventh may be closed when the first reset signal is deasserted and otherwise open.

The fourth comparator circuit may include: a fourth comparator having its inverting input selectively coupled to its output by a thirteenth switch and selectively coupled to the first tap by a fourteenth switch, and having its non-inverting input selectively coupled to ground by a fifteenth switch and selectively coupled to signal ground by a sixteenth switch, wherein the output of the fourth comparator is coupled to a gate of the second transistor to deliver the second high side control signal thereto; and a fourth output capacitor coupled between the output of the fourth comparator and signal ground. The thirteenth and sixteenth switches may be closed when a second reset signal is asserted and otherwise open, and the fourteenth and fifteenth switches may be closed when the second reset signal is deasserted and otherwise open.

Also disclosed herein is wireless power receiver, including: a half-bridge rectifier comprising a first transistor coupled between a regulator output node and a first tap, a second transistor coupled between the first tap and ground, and a short coupled between a second tap and ground, a receiver coil being coupled between the first tap and the second tap; and a first comparator circuit. The first comparator circuit is configured to: when enabled, compare ground to a voltage at the first tap, and assert a first low side control signal to turn on the second transistor, when the voltage at the first tap is below ground; and when reset, sample an offset of the first comparator circuit. The wireless power receiver also includes a second comparator circuit configured to: when enabled, compare ground to a voltage at second first tap, and assert a first high side control signal to turn on the first transistor, when the voltage at the second tap is below ground; and when reset, sample an offset of the second comparator circuit.

The first comparator circuit may include: a first comparator having its inverting input selectively coupled to its output by a first switch and selectively coupled to the first tap by a second switch, and having its non-inverting input selectively coupled to ground by a third switch and selectively coupled to signal ground by a fourth switch, wherein the output of the first comparator is coupled to a gate of the second transistor to deliver the first low side control signal thereto; and a first output capacitor coupled between the output of the first comparator and signal ground. The first and fourth switches may be closed when a first reset signal is asserted and otherwise open, the second and third switches may be closed when the first reset signal is deasserted and otherwise open.

The second comparator circuit may include: a second comparator having its inverting input selectively coupled to its output by a fifth switch and selectively coupled to the second tap by a sixth switch, and having its non-inverting input selectively coupled to ground by a seventh switch and selectively coupled to signal ground by an eighth switch, wherein the output of the second comparator is coupled to a gate of the first transistor to deliver the second low side control signal thereto; and a second output capacitor coupled between the output of the second comparator and signal ground. The fifth and eighth switches may be closed when a second reset signal is asserted and otherwise open, and the sixth and seventh switches may be closed when the second reset signal is deasserted and otherwise open.

Control circuitry may be configured to: assert the first reset signal from shortly after the voltage at the first tap increases to rise above zero until shortly before the voltage at the first tap decreases to fall below zero; and assert the second reset signal from shortly after the voltage at the second tap increases to rise above zero until shortly before the voltage at the second tap decreases to fall below zero.

BRIEF DESCRIPTION OF THE DRAWINGS

FIG. 7 is a graph showing the input voltages, control voltages, and reset voltages of the bridge rectifier of FIG. 4 during operation according to a third control scheme.

FIG. 8A is a schematic diagram of a first embodiment of the control circuitry 25 as used to generate the reset voltages for operating according to the control scheme of FIG. 7.

FIG. 8B is a schematic diagram of a second embodiment of the control circuitry 25 as used to generate the reset voltages for operating according to the control scheme of FIG. 7.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
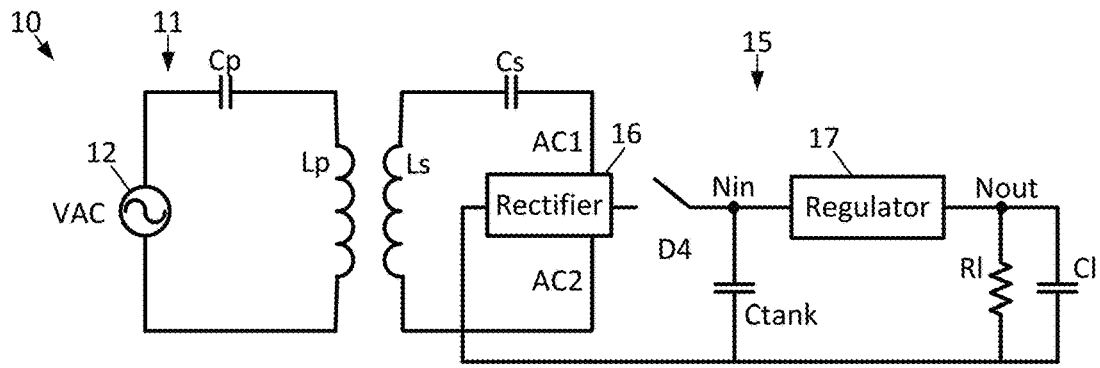
FIG. 1 is a block diagram of a prior art wireless power transmission system.
Figure 2:
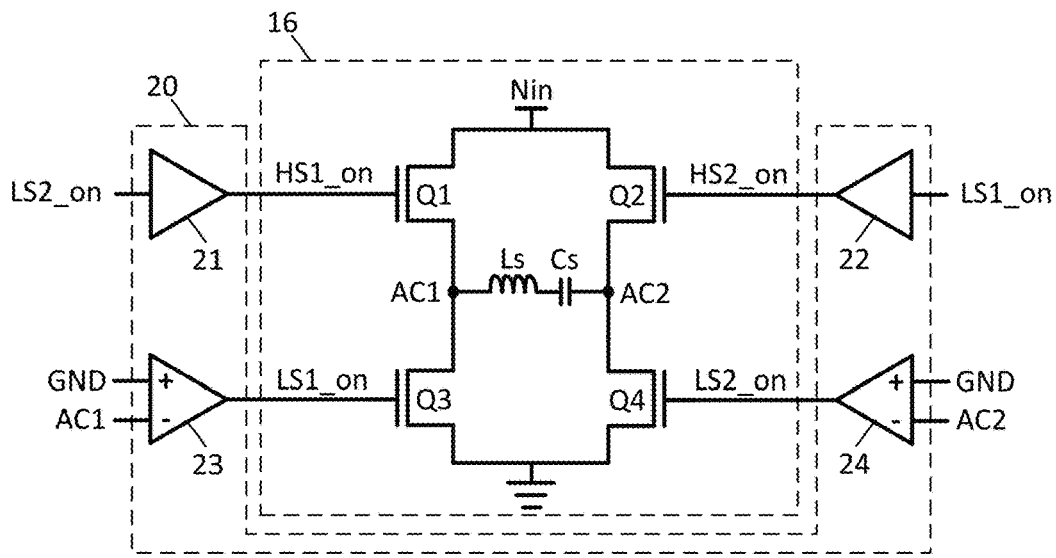
FIG. 2 is a schematic diagram of a prior art bridge rectifier for use in the wireless power transmission system of FIG. 1.
Figure 3:
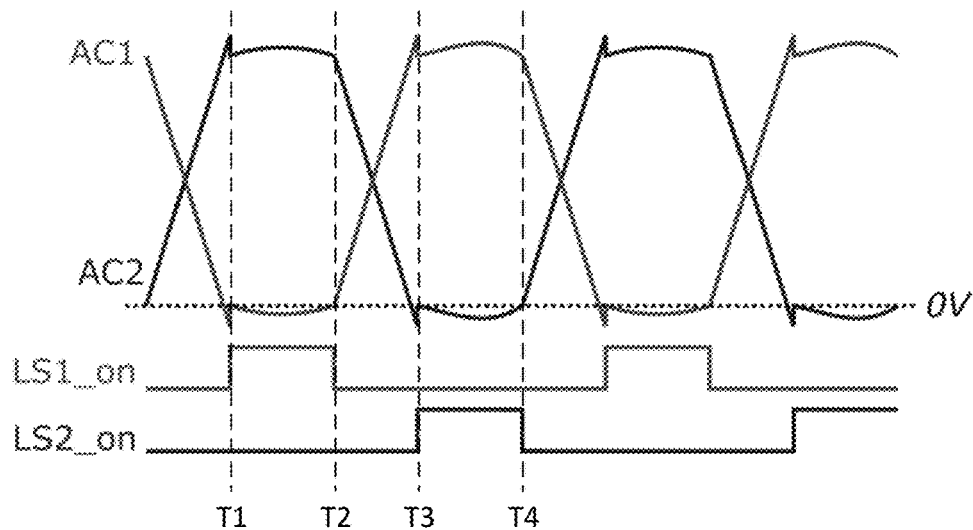
FIG. 3 is a graph showing the input voltages and control voltages of the bridge rectifier of FIG. 2 during operation.
Figure 4:
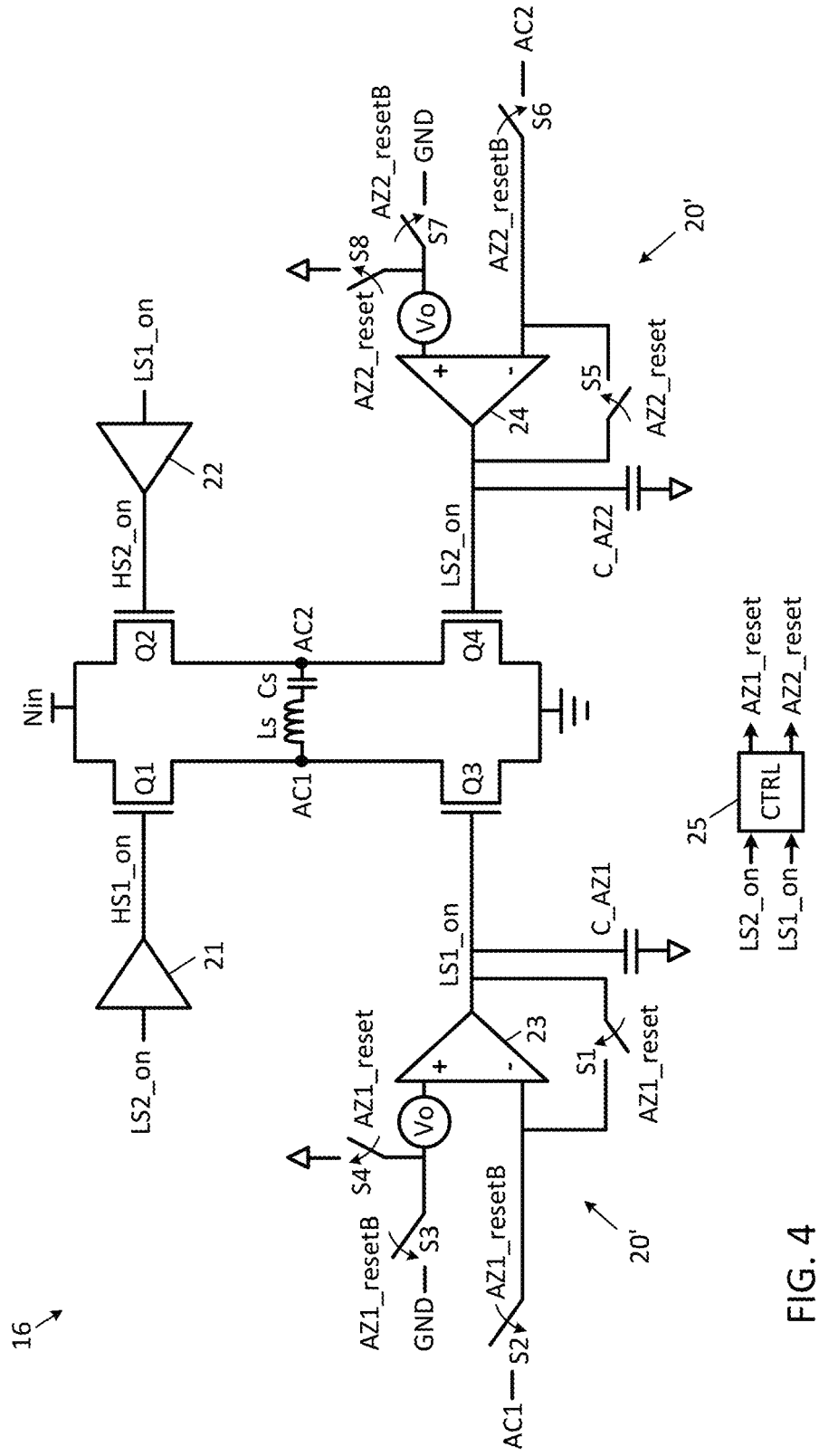
FIG. 4 is a schematic diagram of a bridge rectifier disclosed herein, such as may be used with the wireless power transmission system of FIG. 1.

Now described with initial reference to FIG. 4 is a rectifier 16 for use with a wireless power transmission system, such as that of FIG. 1, where the gate control circuitry 20' includes auto zeroing comparators that may be reset on a cycle to cycle basis synchronously with the voltages at AC1 and AC2.

The rectifier 16, as explained above, includes n-channel transistors Q1 and Q3 coupled in series between node Nin and ground, and n-channel transistors Q2 and Q4 coupled in series between node Nin and ground. The tap between transistors Q1 and Q3 is AC1, and the tap between transistors Q2 and Q4 is AC2. Gate control circuitry 20' provides control signals for the transistors Q1-Q4.

A comparator 23, having an offset of Vo at its non-inverting input, has said non-inverting input selectively coupled to power ground (GND) through a switch S3 and selectively coupled to signal ground through switch S4.

The comparator 23 has an inverting input selectively coupled to AC1 through switch S2, and selectively coupled to the output of the comparator 23 through switch S1. The output of the comparator 23 is coupled to the gate of transistor Q3. A capacitor C_AZ1 is coupled between the gate of the transistor Q3 and signal ground, and the control voltage LS1_on (which controls the gate of transistor Q3) is generated across the capacitor C_AZ1 at the output of the comparator 23. Switches S1-S4 are controlled by the reset signal AZ1_reset and its logical complement.

Note here that signal ground is used as the reference point for internal electronics of the receiver of the wireless power transmission system, that chassis ground indicates a direct electrical connection to the chassis, and that signal ground is, at least at one point, connected to chassis ground. Also note that power ground is, at least at one pointy, connected to chassis ground.

A comparator 24, having an offset of Vo at its non-inverting input, has said non-inverting input selectively coupled to power ground (GND) through a switch S7 and selectively coupled to signal ground through switch S8. The comparator 24 has an inverting input selectively coupled to AC2 through switch S6, and selectively coupled to the output of the comparator 24 through switch S5. The output of the comparator 24 is coupled to the gate of transistor Q4. A capacitor C_AZ2 is coupled between the gate of the transistor Q4 and signal ground, and the control voltage LS2_on (which controls the gate of transistor Q4) is generated across the capacitor C_AZ2 at the output of the comparator 24. Switches S5-S8 are controlled by the reset signal AZ2_reset and its logical complement.

As to control of the switches S1-S8, switches S1 and S4 are controlled by the reset signal AZ1_reset (meaning they are closed when AZ1_reset is high, and otherwise open), switches S2 and S3 are controlled by AZ1_resetB (meaning they are closed when AZ1_reset is low, and otherwise open), switches S5 and S8 are controlled by the control signal AZ2_reset (meaning they are closed when AZ2_reset is high, and otherwise open), and switches S6 and S7 are controlled by AZ2_resetB (meaning they are closed when AZ2_reset is low, and otherwise open).

Control signals AZ1_reset and AZ2_reset are generated by control circuitry 25.

A buffer 21 buffers the control signal LS2_on to produce the control signal HS1_on that controls the gate of transistor Q1, and a buffer 22 buffers the control signal LS1_on to produce the control signal HS2_on that controls the gate of transistor Q2.

Figure 5:
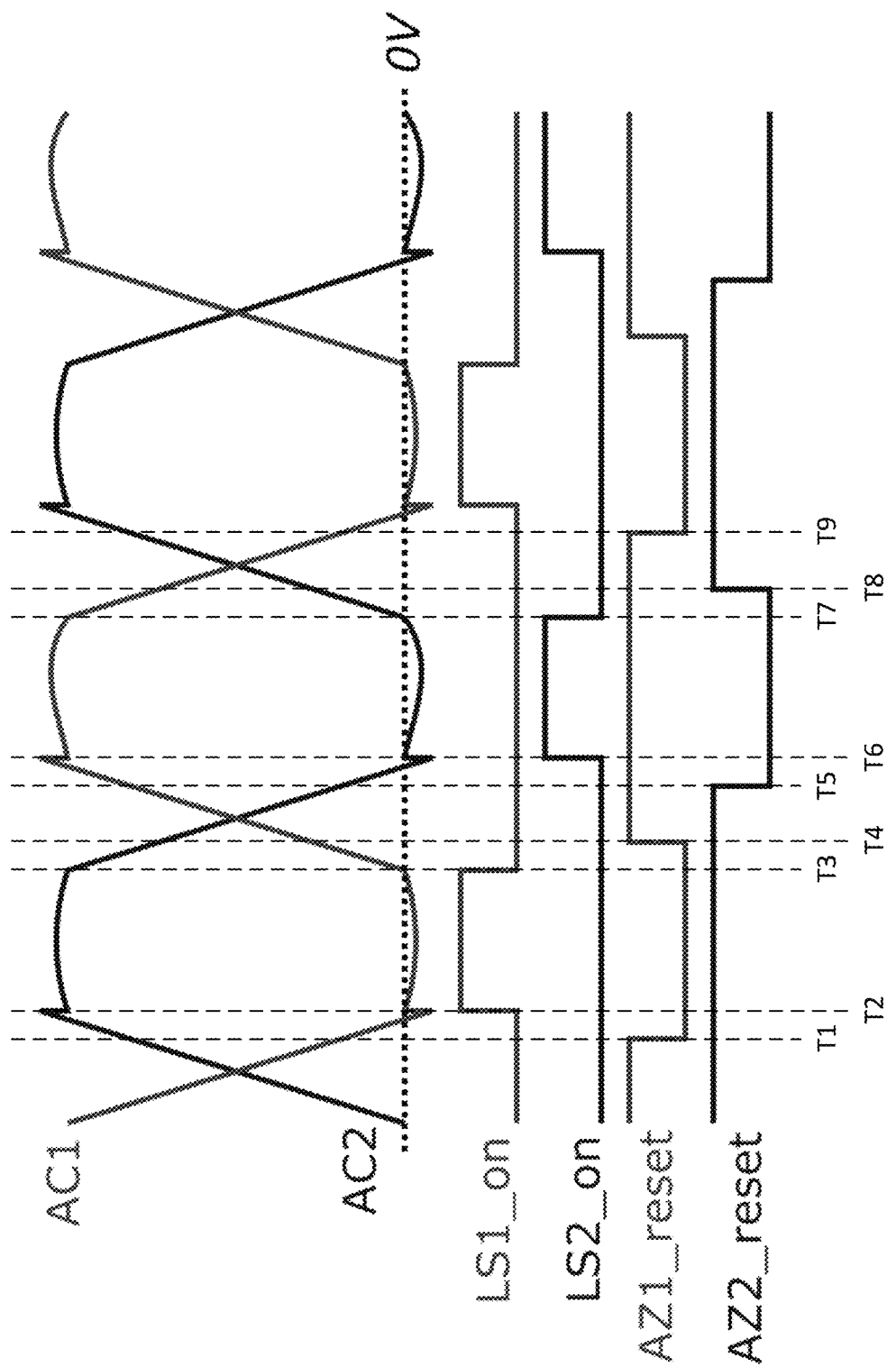
FIG. 5 is a graph showing the input voltages, control voltages, and reset voltages of the bridge rectifier of FIG. 4 during operation according to a first control scheme.

One scheme for operating this rectifier 16 with gate control circuitry 20' is now described with additional reference to FIG. 5. Prior to time T1, it can be seen that the reset signals AZ1_reset and AZ2_reset are both high, with the result being that comparators 23 and 24 are both in a reset state because switches S1, S4 and S5, S8 are closed, causing the comparators 23 and 24 to sample their offsets Vo at their output capacitors C_AZ1 and C_AZ2. This sampling of the offsets during reset serves to cancel out (or "zero" out) the effects of the offsets on the comparators 23 and 24.

At time T1, which is shortly before the voltage at AC1 crosses zero as it falls, the reset signal AZ1_reset goes low, enabling the comparator 23 because switches S2 and S3 are closed. Therefore, at time T2, when the voltage at AC1 crosses zero, the comparator 23 is enabled, and when the zero cross occurs, the output of the comparator 23, the control signal LS1_on, is asserted to thereby turn on transistor Q3. LS1_on being asserted has the result of the control signal HS2_on being asserted to thereby turn on transistor Q2. As a result, current flows from ground to AC1 through transistor Q3, from AC1 to AC2 through receiver coil Ls, and from AC2 to Nin through transistor Q2.

At time T3, the voltage at AC1 rises to cross zero, with the result being that the comparator 23 deasserts the control signal LS1_on, and therefore the buffer 22 deasserts the control signal HS2_on, turning off transistors Q3 and Q2. Thereafter, at time T4 (so, shortly after the voltage at AC1 zero crosses as it rises), the reset signal AZ1_reset goes high, placing the comparator 23 back into the reset state by closing switches S1 and S4, causing the comparator 23 to sample its offset Vo at its output capacitor C_AZ1.

Therefore, the comparator 23 is enabled no longer than from shortly before the voltage at AC1 zero crosses as it falls to shortly after the voltage at AC1 zero crosses as it rises. Otherwise, the comparator 23 is in the reset state, maintaining the capacitor C_AZ1 in its reset state, maintaining the output capacitor C_AZ1 at the offset Vo. Since the reset state is performed repeatedly during operation, its canceling out of the offset can be referred to as an auto-zeroing.

The operation is similar for the comparator 24. At time T5, the reset signal AZ2_reset goes low, enabling the comparator 24 by closing switches S6 and S7. Thus, when the voltage at AC2 zero crosses as it falls at time T6, the comparator 24 is enabled, and when the zero cross occurs, the output of the comparator 24, the control signal LS2_on, is asserted to turn on transistor Q4. LS2_on being asserted has the result of the control signal HS1_on being asserted to thereby turn on the transistor Q1. As a result, current flows from ground to AC2 through transistor Q4, from AC2 to AC1 through receiver coil Ls, and from AC1 to Nin through transistor Q1.

At time T7, the voltage at AC2 rises to cross zero, with the result being that the comparator 24 deasserts the control signal LS2_on, and therefore the buffer 21 deasserts the control signal HS1_on, turning off transistors Q4 and Q1. Thereafter, at time T8 (so, shortly after the voltage at AC2 zero crosses as it rises), the reset signal AZ2_reset goes high, disabling the comparator by closing switches S5 and S8. Therefore, the comparator 24 is enabled no longer than from shortly before the voltage at AC2 zero crosses as it falls to shortly after the voltage at AC2 zero crosses as it rises. Otherwise, the comparator 24 is in the reset state, maintaining the capacitor C_AZ2 in its reset state, maintaining the output capacitor C_AZ2 at the offset Vo. Since the reset state is performed repeatedly during operation, its canceling out of the offset can also be referred to as an auto-zeroing.

Figure 6:
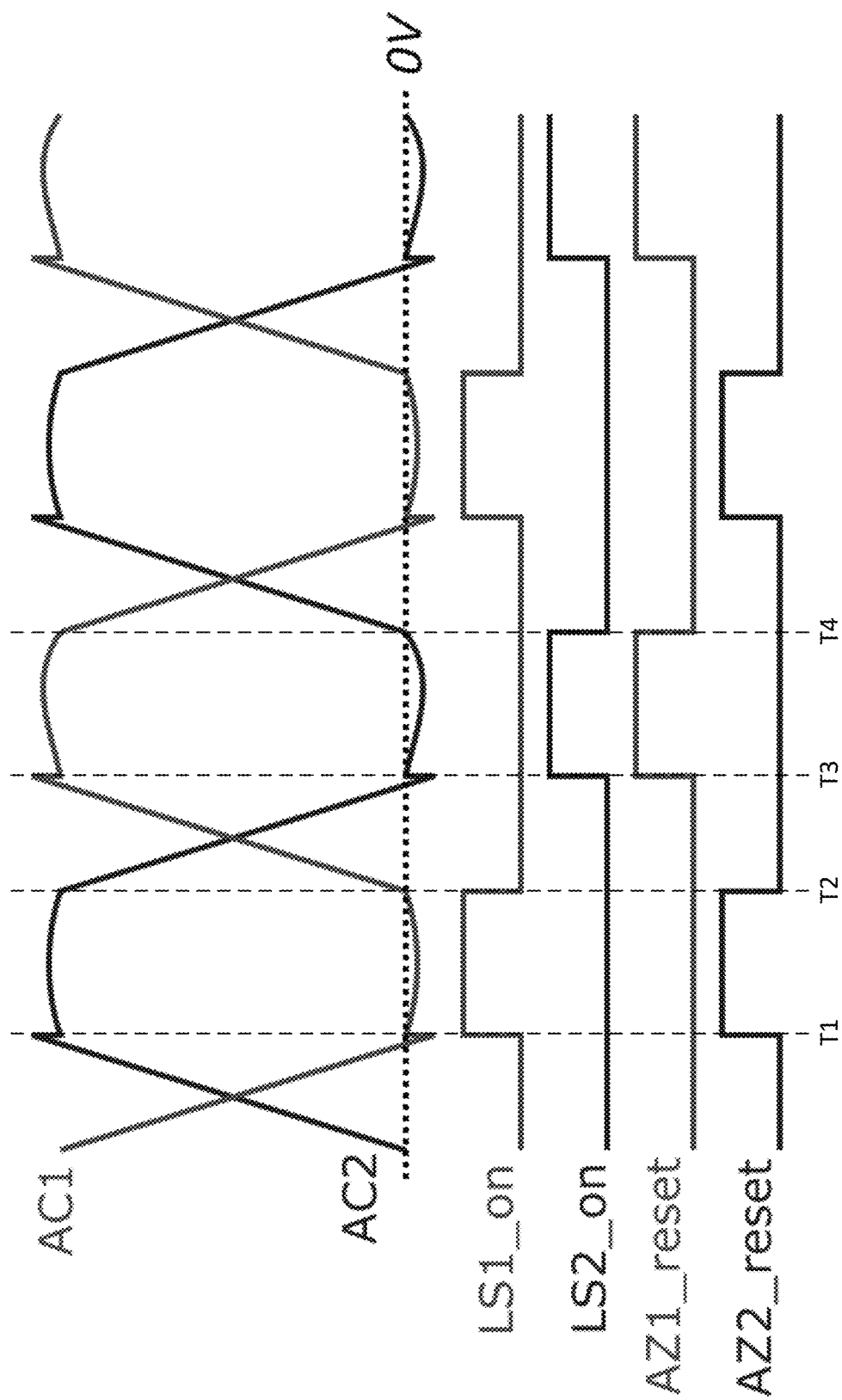
FIG. 6 is a graph showing the input voltages, control voltages, and reset voltages of the bridge rectifier of FIG. 4 during operation according to a second control scheme.

Another scheme for operating the rectifier 16 with gate control circuitry 20' is now described with additional reference to FIG. 6. The difference with respect to FIG. 5 is that here, the control circuitry 25 generates the reset signals AZ1_reset and AZ2_reset as having the same logic level and synchronously with the control signals LS2_on and LS1_on, respectively. Thus, when LS1_on is high, AZ2_reset is high, and when LS2_on is high, AZ1_reset is high. Likewise, when LS1_on is low, AZ2_reset is low, and when LS2_on is low, AZ1_reset is low.

Therefore, explaining the operation as per this scheme now, prior to time T1, the reset signal AZ1_reset is low because the control signal LS2_on is low. The reset signal AZ1_reset being low means that switches S2 and S3 are closed, enabling the comparator 23. Therefore, at time T1 when the voltage at AC1 zero crosses as it falls, the comparator 23 asserts the control signal LS1_on, which is buffered by buffer 22 to assert the control signal HS2_on, resulting in transistors Q3 and Q2 being switched on. As a result, current flows from ground to AC1 through transistor Q3, from AC1 to AC2 through receiver coil Ls, and from AC2 to Nin through transistor Q2.

Since the control signal LS1_on is high, the reset signal AZ2_reset is high, closing switches S5 and S8 while opening switches S6 and S7, placing the comparator 24 into the reset condition, with the comparator 24 sampling its offset Vo at its output capacitor C_AZ2, canceling out the effect of the offset.

At time T2, the voltage at AC1 rises to cross zero, with the result being that the comparator 23 deasserts the control signal LS1_on, and therefore the buffer 22 deasserts the control signal HS2_on, turning off transistors Q3 and Q2.

Between times T2 and T3, the voltages at AC1 and AC2 are both above zero, meaning that even though the rest signals AZ1_reset and AZ2_are both low to enable both comparators 23 and 24, the control signals LS1_on and LS2_on both remain low, with the result being that transistors Q1-Q4 remain off.

At time T3, the voltage at AC2 zero crosses as it falls, with the result being that the comparator 24 asserts the control signal LS2_on at its output, which is in turn buffered by the buffer 21 to assert control signal HS1_on. As a result, transistors Q4 and Q1 are turned on. As a result, current flows from ground to AC2 through transistor Q4, from AC2 to AC1 through receiver coil Ls, and from AC1 to Nin through transistor Q1.

Since the control signal LS2_on is high, the reset signal AZ1_reset is high, closing switches S1 and S4 while opening switches S2 and S3, placing the comparator 23 into the reset condition, with the comparator 23 sampling its offset Vo at its output capacitor C_AZ1, canceling out the effect of the offset.

At time T4, the voltage at AC2 rises to cross zero, with the result being that the comparator 24 deasserts the control signal LS2_on, and therefore the buffer 23 deasserts the control signal HS1_on, turning off transistors Q4 and Q1.

Yet another scheme for operating the rectifier 16 with gate control circuitry 20' is now described with additional reference to FIGS. 7, 8A, and 8B. The principle here is that the control circuitry 25 generates a short pulse of the reset signal AZ1_reset at a rising edge of the control signal LS1_on, and generates a short pulse of the reset signal AZ2_reset at a rising edge of the control signal LS2_on.

This control signal generation is performed by the control circuitry 25 includes edge detectors 25a and 25b, shown in FIG. 8A.

The edge detector 25a includes three cascaded inverters 31, 32, 33, with the first inverter 31 receiving the control signal LS1_on, and the third inverter 33 providing a delayed version of the control signal LS1_on to a first input of AND gate 34. A second input of the AND gate 34 receives the non-delayed version of the control signal LS1_on. The AND gate 34 performs a logical AND operation to produce the reset signal AZ1_reset as output.

The edge detector 25b includes three cascaded inverters 35, 36, 37, with the first inverter 35 receiving the control signal LS2_on, and the third inverter 37 providing a delayed version of the control signal LS2_on to a first input of AND gate 38. A second input of the AND gate 38 receives the non-delayed version of the control signal LS2_on. The AND gate 38 performs a logical AND operation to produce the reset signal AZ2_reset as output.

Therefore, explaining the operation as per this scheme now, prior to time T1, the reset signal AZ1_reset is low because a rising edge of LS1_on has not occurred immediately precedent, and the reset signal AZ2_reset is low because a rising edge of LS2_on has not occurred immediately precedent. As a result, switches S2, S3 and S6, S7 are closed, so at time T1, both comparators 23 and 24 are enabled.

Therefore, at time T1 when the voltage at AC1 zero crosses as it falls, the comparator 23 asserts the control signal LS1_on, which is buffered by buffer 22 to assert the control signal HS2_on, resulting in transistors Q3 and Q2 being switched on. As a result, current flows from ground to AC1 through transistor Q3, from AC1 to AC2 through receiver coil Ls, and from AC2 to Nin through transistor Q2. Once the control signal LS1_on has gone high, the reset signal AZ1_reset briefly goes high, as per the operation of the edge detector 25a, closing switches S1, S4 while opening switches S2, S3, briefly resetting the comparator 23 to sample the offset voltage Vo to thereby continue the cancelation of the comparator offset. This reset is sufficiently brief that the control signal LS1_on is not disturbed.

At time T2, the voltage at AC1 rises to cross zero, with the result being that the comparator 23 deasserts the control signal LS1_on, and therefore the buffer 22 deasserts the control signal HS2_on, turning off transistors Q3 and Q2.

At time T3, the voltage at AC2 zero crosses as it falls, with the result being that the comparator 24 asserts the control signal LS2_on at its output, which is in turn buffered by the buffer 21 to assert control signal HS1_on. As a result, transistors Q4 and Q1 are turned on. Then, current flows from ground to AC2 through transistor Q4, from AC2 to AC1 through receiver coil Ls, and from AC1 to Nin through transistor Q1. Once the control signal LS2_on has gone high, the reset signal AZ2_reset briefly goes high, as per the operation of the edge detector 25b, closing switches S5, S8 while opening switches S6, S7, briefly resetting the comparator 24 to sample the offset voltage Vo to thereby continue the cancelation of comparator offset. This reset is sufficiently brief that the control signal LS2_on is not disturbed.

At time T4, the voltage at AC2 rises to cross zero, with the result being that the comparator 24 deasserts the control signal LS2_on, and therefore the buffer 21 deasserts the control signal HS1_on, turning off transistors Q4 and Q1.

In the above description, the edge detectors 25a and 25b described have been rising edge detectors, and the described operation was based on the use of those rising edge detectors. However, it should appreciated that falling edge detectors may instead be used.

Therefore, as an alternative, the control circuitry 25 may include falling edge detectors 25a' and 25b', shown in FIG. 8B.

The edge detector 25a' includes three cascaded inverters 39, 40, 41, with the first inverter 39 receiving the control signal LS1_on, and the third inverter 41 providing a delayed version of the control signal LS1_on to a first input of NOR gate 42. A second input of the NOR gate 42 receives the non-delayed version of the control signal LS1_on. The NOR gate 42 performs a logical NOR operation to produce the reset signal AZ1_reset as output.

The edge detector 25b' includes three cascaded inverters 43, 44, 45, with the first inverter 43 receiving the control signal LS2_on, and the third inverter 45 providing a delayed version of the control signal LS2_on to a first input of NOR gate 46. A second input of the NOR gate 46 receives the non-delayed version of the control signal LS2_on. The NOR gate 46 performs a logical NOR operation to produce the reset signal AZ2_reset as output.

Operation of the falling edge variant is as follows. Prior to time T1, the reset signal AZ1_reset is low because a falling edge of LS1_on has not occurred immediately precedent, and the reset signal AZ2_reset is low because a falling edge of LS2_on has not occurred immediately precedent. As a result, switches S2, S3 and S6, S7 are closed, so at time T1, both comparators 23 and 24 are enabled.

Therefore, at time T1 when the voltage at AC1 zero crosses as it falls, the comparator 23 asserts the control signal LS1_on, which is buffered by buffer 22 to assert the control signal HS2_on, resulting in transistors Q3 and Q2 being switched on. As a result, current flows from ground to AC1 through transistor Q3, from AC1 to AC2 through receiver coil Ls, and from AC2 to Nin through transistor Q2.

At time T2, the voltage at AC1 rises to cross zero, with the result being that the comparator 23 deasserts the control signal LS1_on, and therefore the buffer 22 deasserts the control signal HS2_on, turning off transistors Q3 and Q2. Once the control signal LS1_on has fallen low, the reset signal AZ1_reset briefly goes high, as per the operation of the edge detector 25a, closing switches S1, S4 while opening switches S2, S3, briefly resetting the comparator 23 to sample the offset voltage Vo to thereby continue the cancelation of the comparator offset.

At time T3, the voltage at AC2 zero crosses as it falls, with the result being that the comparator 24 asserts the control signal LS2_on at its output, which is in turn buffered by the buffer 21 to assert control signal HS1_on. As a result, transistors Q4 and Q1 are turned on. Then, current flows from ground to AC2 through transistor Q4, from AC2 to AC1 through receiver coil Ls, and from AC1 to Nin through transistor Q1.

At time T4, the voltage at AC2 rises to cross zero, with the result being that the comparator 24 deasserts the control signal LS2_on, and therefore the buffer 21 deasserts the control signal HS1_on, turning off transistors Q4 and Q1. Once the control signal LS2_on has fallen low, the reset signal AZ2_reset briefly goes high, as per the operation of the edge detector 25b, closing switches S5, S8 while opening switches S6, S7, briefly resetting the comparator 24 to sample the offset voltage Vo to thereby continue the cancelation of comparator offset.

Figure 9:
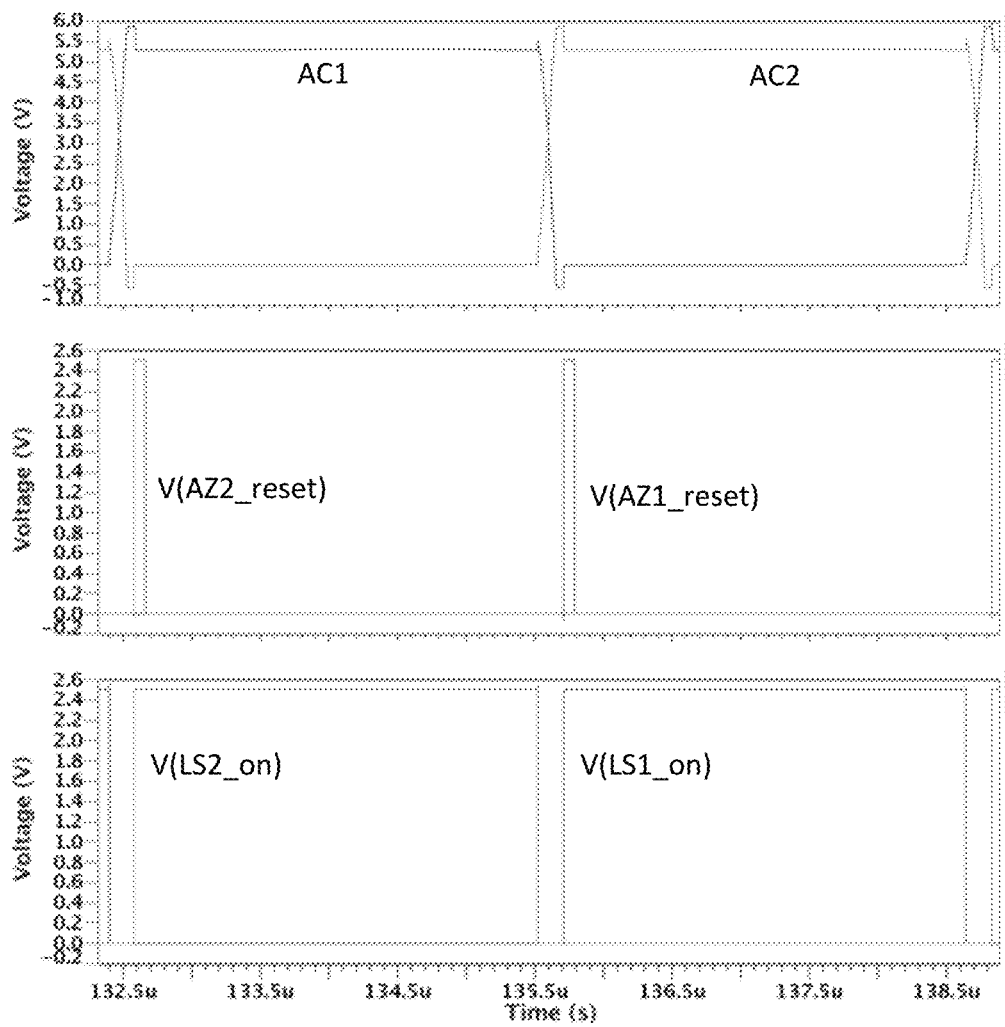
FIG. 9 is an enlarged graph showing the input voltages, control voltages, and reset voltages of the bridge rectifier of FIG. 4 during operation according to the third control scheme.

A more precise graph showing the voltages at AC1 and AC2, the reset signals AZ1_reset and AZ2_reset, and the control signals LS1_on and LS2_on for the rising edge detection embodiment may be found at FIG. 9. Note here how briefly the reset signals AZ1_reset and AZ2_reset are asserted at the rising edges of the control signals LS1_on and LS2_on.

Figure 10:
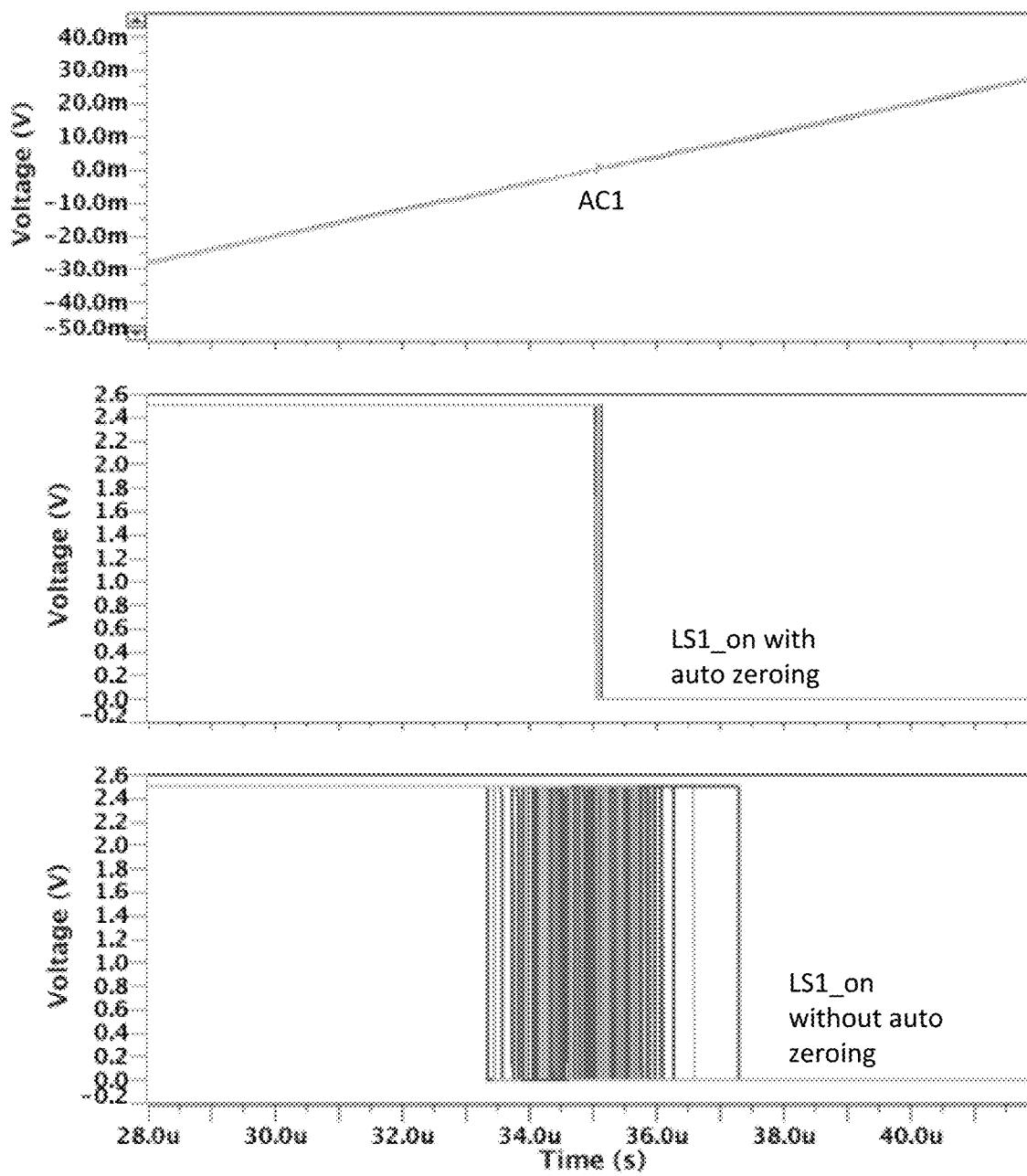
FIG. 10 is a greatly enlarged graph showing the input voltages and control voltages of the bridge rectifier of FIG. 4 during operation according to the third control scheme, here illustrating how the auto zeroing reduces inaccuracy at the comparator output.

A more precise graph showing the voltage at AC1 and the control signal LS1_on with the comparator 23 using the auto zeroing function, and the control signal LS1_on with the comparator 23 not using the auto-zeroing function is observed in FIG. 10. The use of the auto zeroing is shown as clearly reducing errors in the control signal LS1_on at the comparator 23 output during zero crossing of the voltage at AC1 compared to without the auto zeroing. Indeed, without the auto zeroing, the offset is approximately 15.3 mV, but with the auto zeroing, the offset is reduced to merely 0.3 mV.

The above control schemes of FIGS. 5-7 have been described with reference to their performance on the rectifier 16 of FIG. 4, using the gate control circuitry 20'. This gate control circuitry 20' utilizes comparators 23 and 24 to generate the control signals LS1_on and LS2_on for transistors Q3 and Q4, and buffers 21 and 22 have been used to generate the control signals HS1_on and HS2_on for transistors Q1 and Q2.

However, another embodiment is now described in which comparators 21' and 22' are used to generate the control signals HS1_on and HS2_on for transistors Q1 and Q2 as well. This may be seen in FIG. 11.

Here, the control circuitry 20" uses the control signals HS1_on and HS2_on as the reset signals for the comparators 23 and 24, while the reset signals AZ1_reset and AZ2_reset are used as reset signals for the comparators 21' and 22'.

In greater detail, the comparator 21' has a non-inverting input selectively coupled to a reference voltage VREF through a switch S11, selectively coupled to signal ground through a switch S12, and having an offset of Vo. The comparator 21' has an inverting input selectively coupled to AC2 through a switch S10, and selectively coupled to the output of the comparator 21' through a switch S9. The switches S10 and S11 are closed when the reset signal AZ1_reset is low, and otherwise open. The switches S9 and S12 are closed when the reset signal AZ1_reset is high, and otherwise open. An output capacitor C_AZ3 is coupled between the output of the comparator 21' and signal ground, and the comparator 21' generates the control signal HS1_on at its output to control the transistor Q1.

The comparator 22' has a non-inverting input selectively coupled to power ground GND through a switch S15, selectively coupled to signal ground through a switch S16, and having an offset of Vo. The comparator 22' has an inverting input selectively coupled to AC1 through a switch S14, and selectively coupled to the output of the comparator 22' through a switch S13. The switches S14 and S15 are closed when the reset signal AZ2_reset is low, and otherwise open. The switches S13 and S16 are closed when the reset signal AZ2_reset is high, and otherwise open. An output capacitor C_AZ4 is coupled between the output of the comparator 22' and signal ground, and the comparator 22' generates the control signal HS2_on at its output to control the transistor Q2.

The comparator 23' has a non-inverting input selectively coupled to power ground GND through a switch S3, selectively coupled to signal ground through a switch S4, and having an offset of Vo. The comparator 23' has an inverting input selectively coupled to AC1 through a switch S2, and selectively coupled to the output of the comparator 23' through a switch S1. The switches S2 and S3 are closed when the control signal HS2_on is low, and otherwise open. The switches S1 and S4 are closed when the control signal HS2_on is high, and otherwise open. An output capacitor C_AZ1 is coupled between the output of the comparator 23' and signal ground, and the comparator 23' generates the control signal LS1_on at its output to control the transistor Q3.

The comparator 24' has a non-inverting input selectively coupled to power ground GND through a switch S7, selectively coupled to signal ground through a switch S8, and having an offset of Vo. The comparator 24' has an inverting input selectively coupled to AC2 through a switch S6, and selectively coupled to the output of the comparator 24' through a switch S5. The switches S6 and S7 are closed when the control signal HS1_on is low, and otherwise open. The switches S5 and S8 are closed when the control signal HS1_on is high, and otherwise open. An output capacitor C_AZ2 is coupled between the output of the comparator 24' and signal ground, and the comparator 24' generates the control signal LS2_on at its output to control the transistor Q4.

Figure 11:
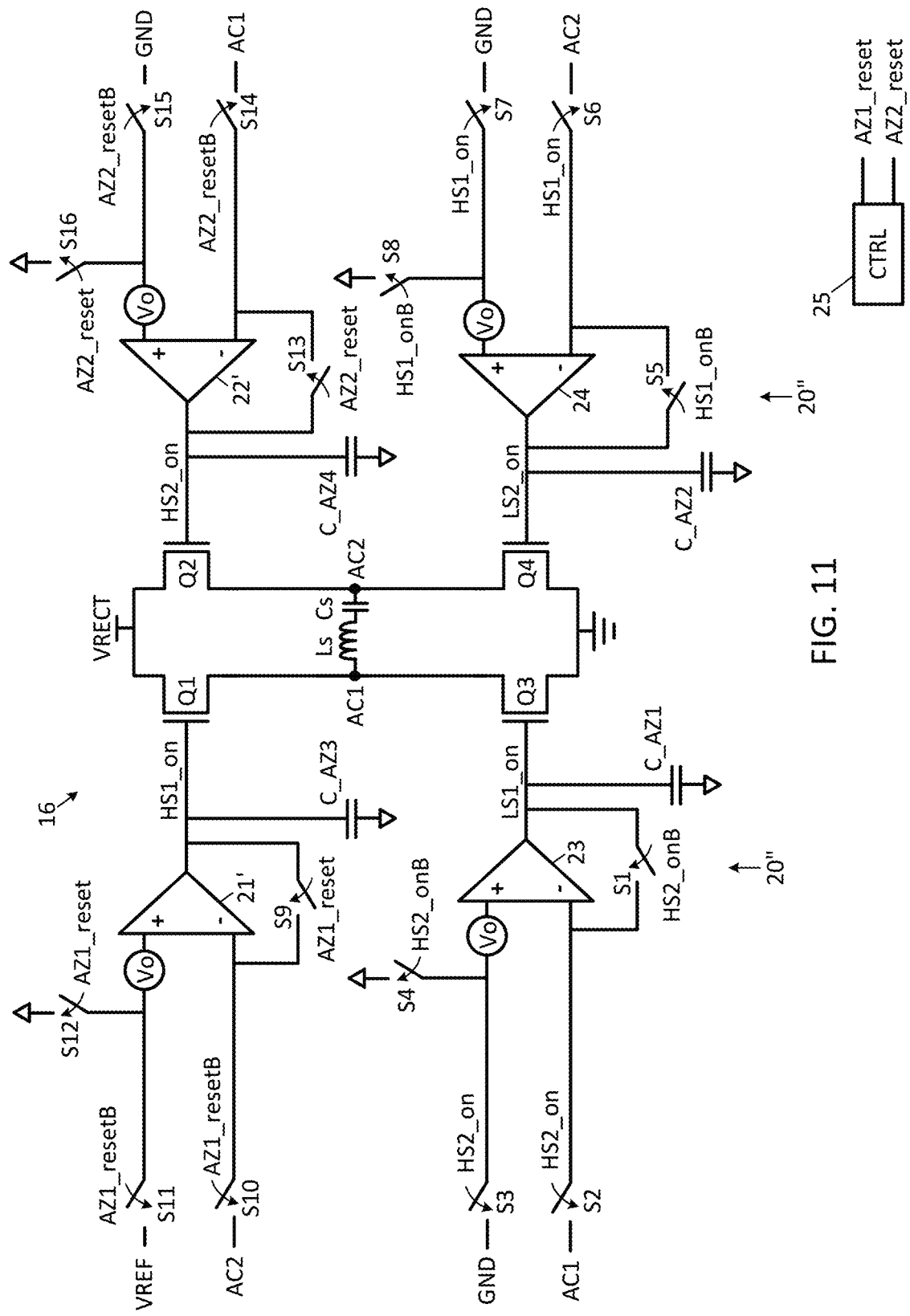
FIG. 11 is a schematic diagram of another bridge rectifier disclosed herein, such as may be used with the wireless power transmission system of FIG. 1.
Figure 12:
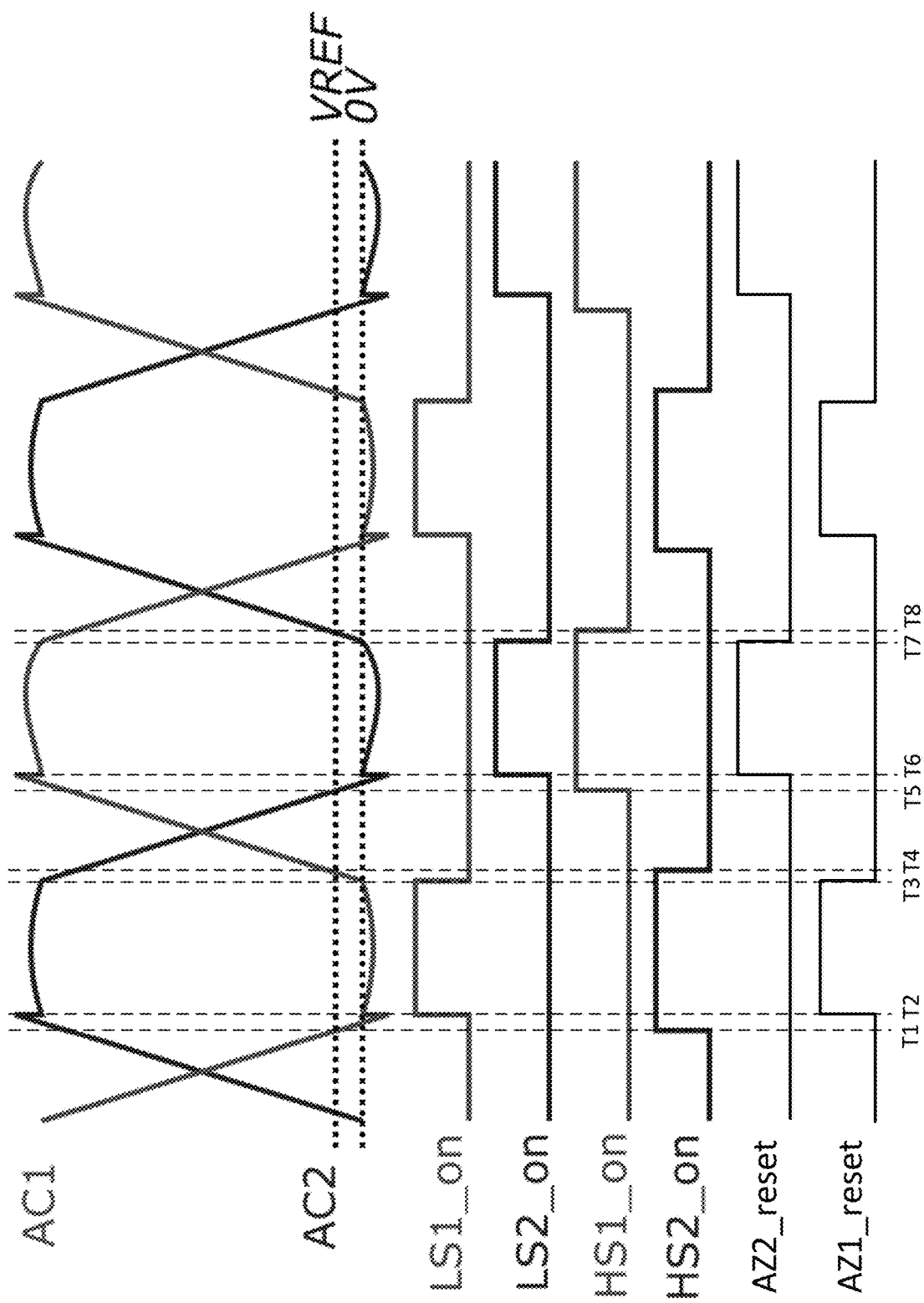
FIG. 12 is a graph showing the input voltages, control voltages, and reset voltages of the bridge rectifier of FIG. 11 during operation according to a fourth control scheme.

Operation of the embodiment of FIG. 11 is now described with additional reference to FIG. 12.

Prior to time T1, the reset signal AZ2_reset is low. The reset signal AZ2_reset being low means that switches S14 and S15 are closed, enabling the comparator 22'. Therefore, at time T1 when the voltage at AC1 zero crosses as it falls, the comparator 22' asserts the control signal HS2_on, turning on transistor Q2. The control signal HS2_on being high closes switches S2 and S3, turning on comparator 23. Since the voltage at AC1 is negative, at time T2, the control signal LS1_on is asserted, turning on transistor Q3. Transistors Q2 and Q3 being on results in current flowing from ground to AC1 through transistor Q3, from AC1 to AC2 through receiver coil Ls, and from AC2 to Nin through transistor Q2.

Reset signal AZ1_reset goes high at time T2, with the result being that switches S9 and S12 are in a closed state, placing comparator 21' into its reset state. This means that the control signal HS1_on is low, so transistor Q1 is off, with the comparator 21' sampling its offset Vo at its output capacitor C_AZ3, canceling out the effect of the offset. Moreover, control signal HS1_on being low serves to close switches S5 and S8 to thereby place comparator 24 into its reset state, turning off transistor Q4, with the comparator 24 sampling its offset Vo at its output capacitor C_AZ2, canceling out the effect of the offset.

At time T3, the voltage at AC1 rises to cross zero, with the result being that the comparator 23 deasserts the control signal LS1_on, turning off transistor Q3. Moreover, the reset signal AZ2_reset is low at time T3, closing switches S13 and S16 to place the comparator 22' into the reset state, pulling the control signal HS2_on low at time T4, and turning off transistor Q2. The control signal HS2_on being low closes switches S1 and S4, placing the comparator 23 into its reset state, with the comparator 23 sampling its offset Vo at its output capacitor C_AZ1, canceling out the effect of the offset.

At time T3, the reset signal AZ1_reset transitions low, meaning that switches S10 and S11 are closed to enable the comparator 21'. Therefore, when at time T5 the voltage AC2 zero crosses as it falls and the comparator 21' resultingly asserts the control signal HS1_on at its output, switches S6 and S7 are closed to activate comparator 24. The control signal HS1_on being asserted turns on transistor Q1, and AC2 zero crossing causes the comparator 24 to assert the control signal LS2_on at time T6 to turn on transistor Q4. As a result, current flows from ground to AC2 through transistor Q4, from AC2 to AC1 through receiver coil Ls, and from AC1 to Nin through transistor Q1.

Reset signal AZ2_reset goes high at time T6, with the result being that switches S13 and S16 are in a closed state, placing comparator 22' into its reset state. This means that the control signal HS2_on is low, so transistor Q2 is off, with the comparator 22' sampling its offset Vo at its output capacitor C_AZ4, canceling out the effect of the offset. Moreover, control signal HS2_on being low serves to close switches S1 and S4 to thereby place comparator 23 into its reset state, turning off transistor Q3, with the comparator 23 sampling its offset Vo at its output capacitor C_AZ1, canceling out the effect of the offset.

At time T7, the voltage at AC2 rises to cross zero, with the result being that the comparator 21' deasserts the control signal HS1_on at time T8, turning off transistor Q1. The control signal HS1_on being deasserted serves to close switches S5 and S8, placing comparator 24 in its reset state, with the control signal LS2_on going low to turn off transistor Q4.

Note that the control schemes and control circuitry 20' described above may generally be applied to a half-bridge rectifier embodiment. For example, the comparator 23 and its associated control circuitry 20' may be used to form the half-bridge rectifier, with the control scheme of FIG. 13 being usable to control the control circuitry 20'. The operation of the comparator 23 proceeds as in the control scheme of FIG. 5, but it should appreciated here that the waveform for the voltage at AC2 is different due to the half bridge arrangement. Indeed, the waveform for the voltage at AC2 is comprised of periodic alternating positive and negative pulses, with the magnitude of the voltage at AC2 being substantially less than the voltage at AC1.

Figure 14:
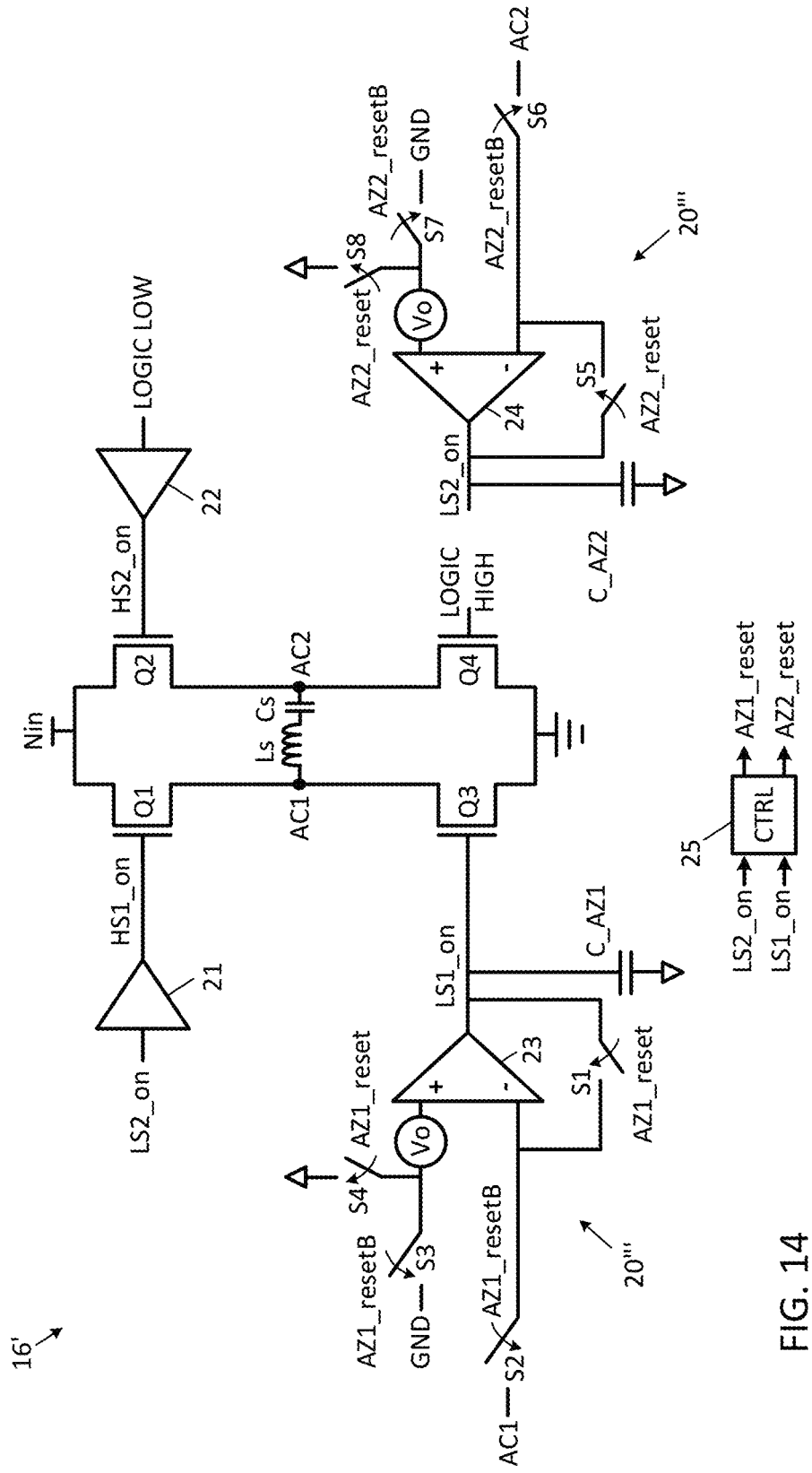
FIG. 14 is a schematic diagram of a half-bridge rectifier disclosed herein, such as may be used with the wireless power transmission system of FIG. 1.

The hardware for the half-bridge rectifier 16' is now described with additional reference to FIG. 14.

In this variant, the gate control circuitry 20''' includes auto zeroing comparators that may be reset on a cycle to cycle basis synchronously with the voltages at AC1 and AC2.

The rectifier 16' includes n-channel transistors Q1 and Q3 coupled in series between node Nin and ground, and n-channel transistors Q2 and Q4 coupled in series between node Nin and ground. The tap between transistors Q1 and Q3 is AC1, and the tap between transistors Q2 and Q4 is AC2. Gate control circuitry 20' provides control signals for the transistors Q1-Q4.

A comparator 23, having an offset of Vo at its non-inverting input, has said non-inverting input selectively coupled to power ground (GND) through a switch S3 and selectively coupled to signal ground through switch S4. The comparator 23 has an inverting input selectively coupled to AC1 through switch S2, and selectively coupled to the output of the comparator 23 through switch S1. The output of the comparator 23 is coupled to the gate of transistor Q3. A capacitor C_AZ1 is coupled between the gate of the transistor Q3 and signal ground, and the control voltage LS1_on (which controls the gate of transistor Q3) is generated across the capacitor C_AZ1 at the output of the comparator 23. Switches S1-S4 are controlled by the reset signal AZ1_reset and its logical complement.

A comparator 24, having an offset of Vo at its non-inverting input, has said non-inverting input selectively coupled to power ground (GND) through a switch S7 and selectively coupled to signal ground through switch S8. The comparator 24 has an inverting input selectively coupled to AC2 through switch S6, and selectively coupled to the output of the comparator 24 through switch S5. A capacitor C_AZ2 is coupled between the gate of the transistor Q4 and signal ground, and the control voltage LS2_on is generated across the capacitor C_AZ2 at the output of the comparator 24. Switches S5-S8 are controlled by the reset signal AZ2_reset and its logical complement. As compared to the design of FIG. 4, notice that the gate of the transistor Q4 is tied to a logic high, meaning that the transistor Q4 is kept on during operation of the half-bridge 16'; therefore, the transistor Q4 may, if desired, be replaced by a short.

As to control of the switches S1-S8, switches S1 and S4 are controlled by the reset signal AZ1_reset (meaning they are closed when AZ1_reset is high, and otherwise open), switches S2 and S3 are controlled by AZ1_resetB (meaning they are closed when AZ1_reset is low, and otherwise open), switches S5 and S8 are controlled by the control signal AZ2_reset (meaning they are closed when AZ2_reset is high, and otherwise open), and switches S6 and S7 are controlled by AZ2_resetB (meaning they are closed when AZ2_reset is low, and otherwise open).

Control signals AZ1_reset and AZ2_reset are generated by control circuitry 25.

A buffer 21 buffers the control signal LS2_on to produce the control signal HS1_on that controls the gate of transistor Q1, and a buffer 22 buffers a logic low signal to produce the control signal HS2_on that controls the gate of transistor Q2. Therefore, notice that the gate of the transistor Q2 is tied to a logic low, meaning that the transistor Q2 is off during operation of the half-bridge 16'; as such, the transistor Q2 may, if desired, be replaced by an open circuit.

Figure 13:
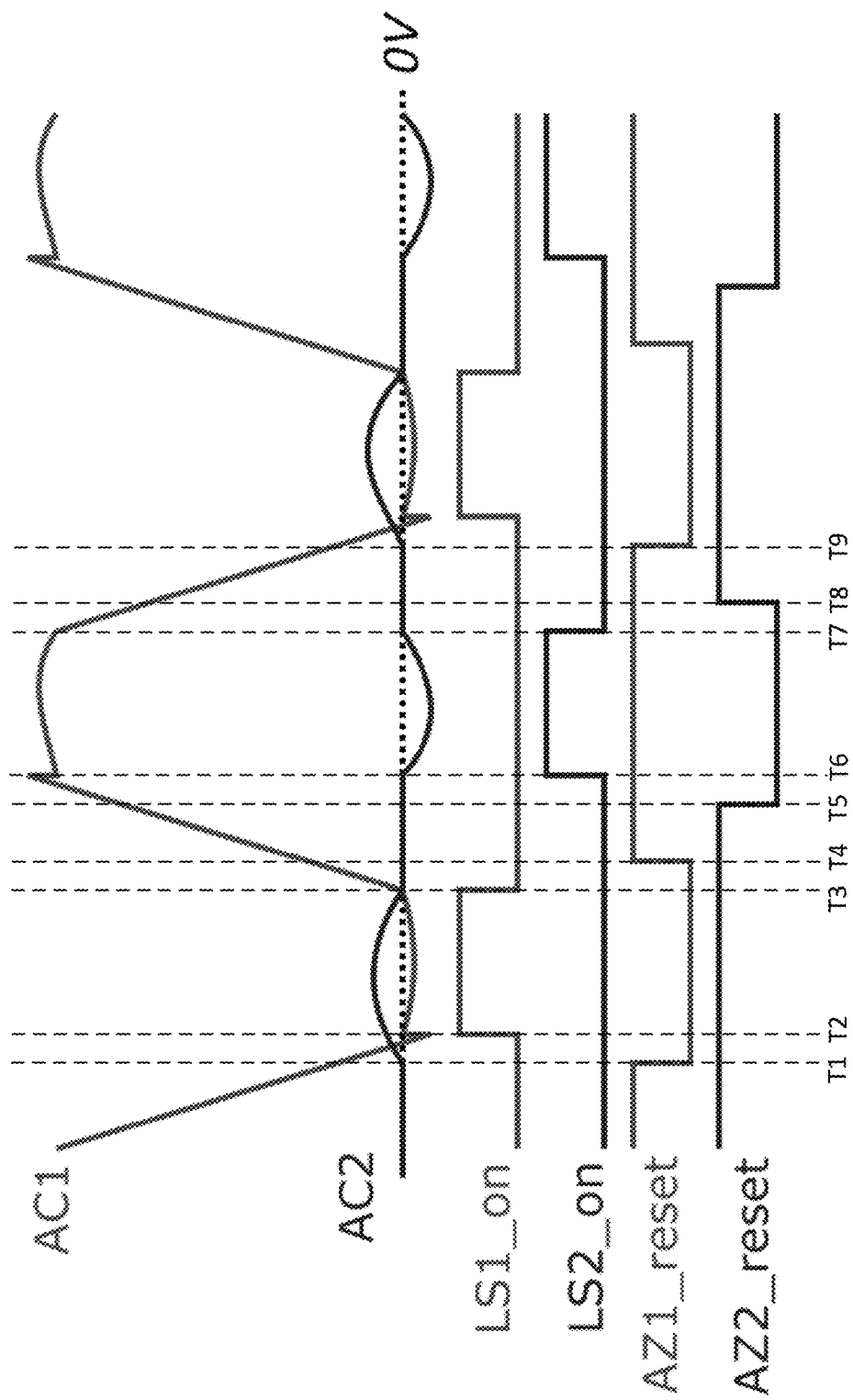
FIG. 13 is a graph showing the input voltages, control voltages, and reset voltages of a half bridge rectifier, such as that of FIG. 14 or 15, during operation according to a fifth control scheme.

Operation is now described in detail with reference to FIG. 13. Prior to time T1, it can be seen that the reset signals AZ1_reset and AZ2_reset are both high, with the result being that comparators 23 and 24 are both in a reset state because switches S1, S4 and S5, S8 are closed, causing the comparators 23 and 24 to sample their offsets Vo at their output capacitors C_AZ1 and C_AZ2. This sampling of the offsets during reset serves to cancel out (or "zero" out) the effects of the offsets on the comparators 23 and 24.

At time T1, which is shortly before the voltage at AC1 crosses zero as it falls, the reset signal AZ1_reset goes low, enabling the comparator 23 because switches S2 and S3 are closed. Therefore, at time T2, when the voltage at AC1 crosses zero, the comparator 23 is enabled, and when the zero cross occurs, the output of the comparator 23, the control signal LS1_on, is asserted to thereby turn on transistor Q3. However, since transistor Q2 is kept off and transistor Q4 is kept on as described above, current does not flow to Nin.

At time T3, the voltage at AC1 rises to cross zero, with the result being that the comparator 23 deasserts the control signal LS1_on, turning off transistor Q3. Thereafter, at time T4 (so, shortly after the voltage at AC1 zero crosses as it rises), the reset signal AZ1_reset goes high, placing the comparator 23 back into the reset state by closing switches S1 and S4, causing the comparator 23 to sample its offset Vo at its output capacitor C_AZ1.

Therefore, the comparator 23 is enabled no longer than from shortly before the voltage at AC1 zero crosses as it falls to shortly after the voltage at AC1 zero crosses as it rises. Otherwise, the comparator 23 is in the reset state.

At time T5, the reset signal AZ2_reset goes low, enabling the comparator 24 by closing switches S6 and S7. Thus, when the voltage at AC2 zero crosses as it falls at time T6, the comparator 24 is enabled, and when the zero cross occurs, the output of the comparator 24, the control signal LS2_on, is asserted, asserting the control signal HS1_on to thereby turn on the transistor Q1. Since transistor Q4 is kept on, current therefore flows from ground to AC2 through transistor Q4, from AC2 to AC1 through receiver coil Ls, and from AC1 to Nin through transistor Q1.

At time T7, the voltage at AC2 rises to cross zero, with the result being that the comparator 24 deasserts the control signal LS2_on, and therefore the buffer 21 deasserts the control signal HS1_on, turning off transistor Q1. Thereafter, at time T8 (so, shortly after the voltage at AC2 zero crosses as it rises), the reset signal AZ2_reset goes high, disabling the comparator by closing switches S5 and S8. Therefore, the comparator 24 is enabled no longer than from shortly before the voltage at AC2 zero crosses as it falls to shortly after the voltage at AC2 zero crosses as it rises. Otherwise, the comparator 24 is in the reset state, maintaining the capacitor C_AZ2 in its reset state, maintaining the output capacitor C_AZ2 at the offset Vo.

Figure 15:
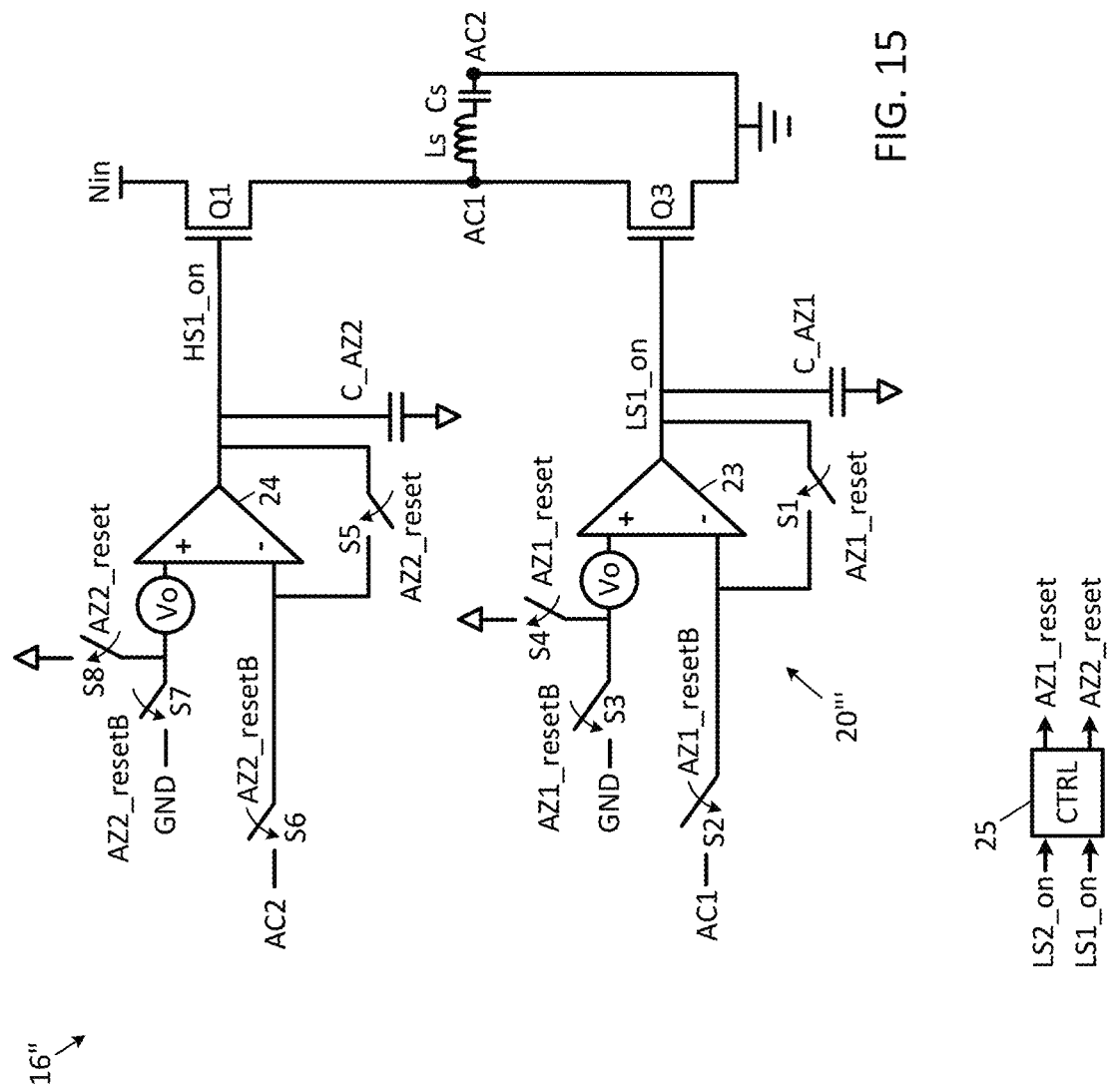
FIG. 15 is a schematic diagram of another half-bridge rectifier disclosed herein, such as may be used with the wireless power transmission system of FIG. 1.

As explained, transistor Q2 may be replaced by an open circuit and transistor Q4 may be replaced by a short. This arrangement of the bridge 16" is shown in FIG. 15. Here, notice that comparator 24 is coupled to the gate of transistor Q1 without an intervening buffer. Operation proceeds as described above with reference to FIG. 13.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A wireless power receiver, comprising:
    a bridge rectifier comprising a first transistor coupled between a regulator output node and a first tap, a second transistor coupled between the regulator output node and a second tap, a third transistor coupled between the first tap and ground, and a fourth transistor coupled between the second tap and ground;
    a first comparator circuit configured to:
        when enabled, compare ground to a voltage at the first tap, and assert a first low side control signal to turn on the third transistor, when the voltage at the first tap is below ground; and
        when reset, sample an offset of the first comparator circuit; and
    a second comparator circuit configured to:
        when enabled, compare ground to a voltage at the second tap, and assert a second low side control signal to turn on the fourth transistor, when the voltage at the second tap is below ground; and
        when reset, sample an offset of the second comparator circuit.

2. The wireless power receiver of claim 1, further comprising:
    a first buffer configured to buffer the second low side control signal to produce a first high side control signal to turn on the first transistor when the voltage at the second tap is below ground; and
    a second buffer configured to buffer the first low side control signal to produce a second high side control signal to turn on the second transistor when the voltage at the first tap is below ground.

3. The wireless power receiver of claim 1, wherein the first comparator circuit comprises:
    a first comparator having its inverting input selectively coupled to its output by a first switch and selectively coupled to the first tap by a second switch, and having its non-inverting input selectively coupled to ground by a third switch and selectively coupled to signal ground by a fourth switch, wherein the output of the first comparator is coupled to a gate of the third transistor to deliver the first low side control signal thereto; and
    a first output capacitor coupled between the output of the first comparator and signal ground;
    wherein the first and fourth switches are closed when a first reset signal is asserted and otherwise open; and
    wherein the second and third switches are closed when the first reset signal is deasserted and otherwise open.

4. The wireless power receiver of claim 3, wherein the second comparator circuit comprises:
a second comparator having its inverting input selectively coupled to its output by a fifth switch and selectively coupled to the second tap by a sixth switch, and having its non-inverting input selectively coupled to ground by a seventh switch and selectively coupled to signal ground by an eighth switch, wherein the output of the second comparator is coupled to a gate of the fourth transistor to deliver the second low side control signal thereto; and
a second output capacitor coupled between the output of the second comparator and signal ground;
wherein the fifth and eighth switches are closed when a second reset signal is asserted and otherwise open; and
wherein the sixth and seventh switches are closed when the second reset signal is deasserted and otherwise open.

5. The wireless power receiver of claim 4, further comprising control circuitry configured to:
assert the first reset signal from shortly after the voltage at the first tap increases to rise above zero until shortly before the voltage at the first tap decreases to fall below zero; and
assert the second reset signal from shortly after the voltage at the second tap increases to rise above zero until shortly before the voltage at the second tap decreases to fall below zero.

6. The wireless power receiver of claim 4, further comprising control circuitry configured to:
assert the second reset signal when the first low side control signal is asserted; and
assert the first reset signal when the second low side control signal is asserted.

7. The wireless power receiver of claim 4, further comprising control circuitry configured to:
assert the first reset signal at rising edges of the first low side control signal for a period of time less than a period of time over which the first low side control signal is asserted; and
assert the second reset signal at rising edges of the second low side control signal for a period of time less than a period of time over which the second low side control signal is asserted.

8. The wireless power receiver of claim 4, further comprising control circuitry configured to:
assert the first reset signal at falling edges of the first low side control signal for a period of time less than a period of time over which the first low side control signal is asserted; and
assert the second reset signal at falling edges of the second low side control signal for a period of time less than a period of time over which the second low side control signal is asserted.

9. The wireless power receiver of claim 1, further comprising:
a third comparator circuit configured to:
when enabled, compare ground to the voltage at the second tap, and assert a first high side control signal to turn on the first transistor, when the voltage at the second tap is below ground; and
when reset, sample an offset of the third comparator circuit; and
a fourth comparator circuit configured to:
when enabled, compare ground to the voltage at the first tap, and assert a second high side control signal to turn on the second transistor, when the voltage at the first tap is below ground; and
when reset, sample an offset of the fourth comparator circuit.

10. The wireless power receiver of claim 9,
wherein the first comparator circuit comprises:
a first comparator having its inverting input selectively coupled to its output by a first switch and selectively coupled to the first tap by a second switch, and having its non-inverting input selectively coupled to ground by a third switch and selectively coupled to signal ground by a fourth switch, wherein the output of the first comparator is coupled to a gate of the third transistor to deliver the first low side control signal thereto; and
a first output capacitor coupled between the output of the first comparator and signal ground;
wherein the first and fourth switches are closed when the second high side control signal is asserted and otherwise open; and
wherein the second and third switches are closed when the second high side control signal is deasserted and otherwise open;
wherein the second comparator circuit comprises:
a second comparator having its inverting input selectively coupled to its output by a fifth switch and selectively coupled to the second tap by a sixth switch, and having its non-inverting input selectively coupled to ground by a seventh switch and selectively coupled to signal ground by an eighth switch, wherein the output of the second comparator is coupled to a gate of the fourth transistor to deliver the second low side control signal thereto; and
a second output capacitor coupled between the output of the second comparator and signal ground;
wherein the fifth and eighth switches are closed when the first high side control signal is asserted and otherwise open; and
wherein the sixth and seventh switches are closed when the first high side control signal is deasserted and otherwise open;
wherein the third comparator circuit comprises:
a third comparator having its inverting input selectively coupled to its output by a ninth switch and selectively coupled to the second tap by a tenth switch, and having its non-inverting input selectively coupled to ground by an eleventh switch and selectively coupled to signal ground by a twelfth switch, wherein the output of the third comparator is coupled to a gate of the first transistor to deliver the first high side control signal thereto; and
a third output capacitor coupled between the output of the third comparator and signal ground;
wherein the ninth and twelfth switches are closed when a first reset signal is asserted and otherwise open; and
wherein the tenth and eleventh are closed when the first reset signal is deasserted and otherwise open; and
wherein the fourth comparator circuit comprises:
a fourth comparator having its inverting input selectively coupled to its output by a thirteenth switch and selectively coupled to the first tap by a fourteenth switch, and having its non-inverting input selectively coupled to ground by a fifteenth switch and selectively coupled to signal ground by a sixteenth switch, wherein the output of the fourth comparator is coupled to a gate of the second transistor to deliver the second high side control signal thereto; and a fourth output capacitor coupled between the output of the fourth comparator and signal ground;

wherein the thirteenth and sixteenth switches are closed when a second reset signal is asserted and otherwise open; and wherein the fourteenth and fifteenth switches are closed when the second reset signal is deasserted and otherwise open.

11. A method of operating a rectifier, comprising:

comparing a voltage at a first rectifier node to ground, and turning on a first transistor when the voltage at the first rectifier node is below ground to thereby perform rectification, but otherwise turning off the first transistor; and placing a first comparator performing the comparison into a reset condition when the voltage at the first rectifier node is above ground.

12. The method of claim 11, wherein placing the first comparator into the reset condition comprises causing the first comparator to sample an offset at its input.

13. The method of claim 11, wherein performing rectification comprises charging a tank capacitor; and further comprising powering a voltage regulator using the charge stored by the tank capacitor.

14. A method of operating a rectifier, comprising:

comparing a voltage at a first rectifier node to ground, and turning on a first transistor when the voltage at the first rectifier node is below ground to thereby perform rectification, but otherwise turning off the first transistor; and briefly placing a first comparator performing the comparison into a reset condition after the voltage at the first rectifier node falls below ground.

15. The method of claim 14, wherein placing the first comparator into the reset condition comprises causing the first comparator to sample an offset at its input.

16. The method of claim 14, wherein performing rectification comprises charging a tank capacitor; and further comprising powering a voltage regulator using the charge stored by the tank capacitor.

17. A wireless power receiver, comprising:

a half-bridge rectifier comprising a first transistor coupled between a regulator output node and a first tap, a second transistor coupled between the first tap and ground, a short coupled between a second tap and ground, and a receiver coil being coupled between the first tap and the second tap;

a first comparator circuit configured to:
when enabled, compare ground to a voltage at the first tap, and assert a first low side control signal to turn on the second transistor, when the voltage at the first tap is below ground; and
when reset, sample an offset of the first comparator circuit; and a second comparator circuit configured to:
when enabled, compare ground to a voltage at the first tap, and assert a first high side control signal to turn on the first transistor, when the voltage at the first tap is below ground; and
when reset, sample an offset of the second comparator circuit.

18. The wireless power receiver of claim 17, wherein the first comparator circuit comprises:

a first comparator having its inverting input selectively coupled to its output by a first switch and selectively coupled to the first tap by a second switch, and having its non-inverting input selectively coupled to ground by a third switch and selectively coupled to signal ground by a fourth switch, wherein the output of the first comparator is coupled to a gate of the second transistor to deliver the first low side control signal thereto; and a first output capacitor coupled between the output of the first comparator and signal ground;

wherein the first and fourth switches are closed when a first reset signal is asserted and otherwise open; and wherein the second and third switches are closed when the first reset signal is deasserted and otherwise open.

19. The wireless power receiver of claim 18, wherein the second comparator circuit comprises:

a second comparator having its inverting input selectively coupled to its output by a fifth switch and selectively coupled to the first tap by a sixth switch, and having its non-inverting input selectively coupled to ground by a seventh switch and selectively coupled to signal ground by an eighth switch, wherein the output of the second comparator is coupled to a gate of the first transistor to deliver the first high side control signal thereto; and a second output capacitor coupled between the output of the second comparator and signal ground;

wherein the fifth and eighth switches are closed when a second reset signal is asserted and otherwise open; and wherein the sixth and seventh switches are closed when the second reset signal is deasserted and otherwise open.

20. The wireless power receiver of claim 19, further comprising control circuitry configured to:

assert the first reset signal from shortly after the voltage at the first tap increases to rise above zero until shortly before the voltage at the first tap decreases to fall below zero; and assert the second reset signal from shortly after the voltage at the first tap increases to rise above zero until shortly before the voltage at the first tap decreases to fall below zero.

* * * * *